(12) United States Patent
Ren et al.

(10) Patent No.: US 9,951,987 B2
(45) Date of Patent: Apr. 24, 2018

(54) REFRIGERATOR HAVING QUICK-FREEZING FUNCTION

(75) Inventors: Wei Ren, Hefei (CN); Lingyun Li, Hefei (CN); Jian Cheng, Hefei (CN)

(73) Assignees: HEFEI MIDEA REFRIGERATOR CO., LTD., Hefei (CN); HEFEI HUALING CO., LTD., Hefei (CN)

( * ) Notice: Subject to any disclaimer, the term of this patent is extended or adjusted under 35 U.S.C. 154(b) by 385 days.

(21) Appl. No.: 14/240,859

(22) PCT Filed: Nov. 24, 2011

(86) PCT No.: PCT/CN2011/082896
§ 371 (c)(1),
(2), (4) Date: Feb. 25, 2014

(87) PCT Pub. No.: WO2013/026239
PCT Pub. Date: Feb. 28, 2013

(65) Prior Publication Data
US 2014/0216084 A1 Aug. 7, 2014

(30) Foreign Application Priority Data
Aug. 25, 2011 (CN) .......................... 2011 1 0256195

(51) Int. Cl.
*F25D 11/04* (2006.01)
*F25D 17/06* (2006.01)
*F25D 29/00* (2006.01)

(52) U.S. Cl.
CPC ............ *F25D 11/04* (2013.01); *F25D 17/065* (2013.01); *F25B 2600/112* (2013.01);
(Continued)

(58) Field of Classification Search
CPC ........... F25D 2700/122; F25D 2400/30; F25D 2400/28; F25D 2317/061; F25D 23/12;
(Continued)

(56) References Cited

U.S. PATENT DOCUMENTS

| 5,896,753 | A | * | 4/1999 | Kwak | ....................... F25B 5/00 62/324.3 |
| 6,327,867 | B1 | * | 12/2001 | Hyodo | ....................... F25B 5/04 62/187 |
| 2002/0011072 | A1 | * | 1/2002 | Hiraoka | .................. F25D 11/02 62/126 |
| 2005/0039469 | A1 | * | 2/2005 | Nonaka | ................. F25B 49/025 62/129 |

(Continued)

FOREIGN PATENT DOCUMENTS

| CN | 101871715 A | 10/2010 |
| CN | 102353203 A | 2/2012 |

(Continued)

OTHER PUBLICATIONS

International Search Report for Application No. PCT/CN2011/082896 dated Jun. 7, 2012.

*Primary Examiner* — David Teitelbaum
*Assistant Examiner* — Nelson Nieves
(74) *Attorney, Agent, or Firm* — Hodgson Russ LLP (57) ABSTRACT

A refrigerator having a quick-freezing function includes: a main body; at least one freezing chamber disposed in the main body and comprising at least one quick-freezing chamber; a freezing evaporator disposed in the main body, and spaced apart from the at least one freezing chamber via a freezing air duct cover plate; a freezing fan corresponding to the at least one freezing chamber and a quick-freezing fan corresponding to the at least one quick-freezing chamber, and configured to blow cold air generated by the freezing evaporator into the at least one freezing chamber and the at least one quick-freezing chamber respectively; and a controller configured to control the freezing fan and the quick-freezing fan. The refrigerator can maintain the taste and nutrition of foods through quick-freezing, and prolong the fresh period of vegetables and fruits.

11 Claims, 4 Drawing Sheets

(52) U.S. Cl.
CPC ....... *F25B 2600/2511* (2013.01); *F25D 29/00* (2013.01); *F25D 2400/30* (2013.01); *F25D 2700/121* (2013.01); *Y02B 30/743* (2013.01)

(58) Field of Classification Search
CPC ... F25D 23/069; F25D 11/04; F25B 2600/112
See application file for complete search history.

(56) References Cited

U.S. PATENT DOCUMENTS

| | | | | |
|---|---|---|---|---|
| 2005/0136161 A1* | 6/2005 | Okita | ............... | F25D 3/122 |
| | | | | 426/393 |
| 2006/0130513 A1* | 6/2006 | Chang | ............... | F25D 11/022 |
| | | | | 62/441 |
| 2007/0137226 A1* | 6/2007 | Kim | ............... | F25D 11/022 |
| | | | | 62/180 |
| 2010/0126205 A1* | 5/2010 | Oh | ............... | F25D 17/065 |
| | | | | 62/408 |
| 2010/0332048 A1* | 12/2010 | Lee | ............... | F25D 29/00 |
| | | | | 700/300 |
| 2011/0036105 A1* | 2/2011 | Feng | ............... | F25D 21/006 |
| | | | | 62/80 |

FOREIGN PATENT DOCUMENTS

| | | | |
|---|---|---|---|
| CN | 102425898 A | | 4/2012 |
| JP | 2000346531 A | | 12/2000 |
| JP | 2003075050 A | * | 3/2003 |
| JP | 2009293883 A | | 12/2009 |
| KR | 20030039031 A | | 5/2003 |

* cited by examiner

REFRIGERATOR HAVING QUICK-FREEZING FUNCTION

CROSS-REFERENCE TO RELATED APPLICATIONS

The present application is a national phase entry under 35 U.S.C. § 371 of International Application No. PCT/CN2011/082896, filed Nov. 24, 2011, which claims priority from Chinese Patent Application No. 201110256195.2, filed Aug. 25, 2011, all of which are incorporated herein by reference.

FIELD

The present disclosure relates to a refrigerating field, and more particularly relates to a refrigerator having a quick-freezing function.

BACKGROUND

In the related art, a refrigerator having a quick-freezing function generally decreases a temperature of a whole freezing chamber, so as to ensure that the temperature of the whole freezing chamber reaches a predetermined temperature in a short time. However, in conventional refrigerators, the freezing chamber is not partitioned, especially, it is not possible to separately store food to be used immediately after quick-frozen and to quick-freeze the food in a short time. Moreover, even if it is possible to quick freeze the food, it is impossible to pass a zone of maximum ice crystal formation of the food quickly in a shortest time, thus causing severe damage to tissue of the food and making the food lose original taste and nutrition.

Conventional refrigerators having an automatic ice-making function are single-system refrigerators, i.e., a refrigerating system of the refrigerator has only one evaporator and the evaporator is disposed in the freezing chamber. When a refrigerating chamber or an ice-making chamber needs cooling energy, cold air generated by the evaporator is needed to be transported to the refrigerating chamber or the ice-making chamber from the freezing chamber via a fan and an air duct. A travel of this air duct is long, and a generated airflow resistance is large, and thus an energy loss is relatively large. Moreover, as the air duct system is disposed in the refrigerating chamber, a great part of the refrigerating chamber is occupied, thus greatly decreasing a volume utilization of the refrigerating chamber.

Furthermore, due to structure characteristics of the single refrigerating system, the cold air performs a large circulation among the freezing chamber, the ice-making chamber and the refrigerating chamber. Thus, water in the refrigerating chamber will flow to other places such as the freezing chamber and the ice-making chamber, and a humidity of vegetables and fruits stored in the refrigerating chamber is hard to keep. Thus, an air drying phenomenon occurs to such conventional refrigerator, and a fresh period of food rich in water such as vegetables and fruits is short.

SUMMARY

The present disclosure aims to solve at least one of the problems in the prior art.

For this, one objective of the present disclosure is to provide a refrigerator which improves taste and nutrition of quick-frozen food and prolongs a fresh period of vegetables and fruits.

According to embodiments of the present disclosure, a refrigerator is provided. The refrigerator comprises: a main body; at least one freezing chamber disposed in the main body, in which the at least one freezing chamber comprises at least one quick-freezing chamber; a freezing evaporator disposed in the main body and behind the at least one freezing chamber, and spaced apart from the at least one freezing chamber via a freezing air duct cover plate; a freezing fan corresponding to the at least one freezing chamber and a quick-freezing fan corresponding to the at least one quick-freezing chamber, wherein the freezing fan and the quick-freezing fan are disposed above the freezing evaporator respectively and configured to blow cold air generated by the freezing evaporator into the at least one freezing chamber and the at least one quick-freezing chamber respectively; and a controller configured to control the freezing fan and the quick-freezing fan, wherein the controller controls the quick-freezing fan to quick-freeze the at least one quick-freezing chamber when needed.

With the refrigerator according to embodiments of the present disclosure, by dividing the freezing chamber into a plurality of portions and disposing the quick-freezing chamber in the freezing chamber, a special requirement of quick-freezing can be realized. Moreover, under the quick-freezing mode, the food can pass a zone of maximum ice crystal formation thereof quickly, thus ensuring a quality of the food to a maximum extent, maintaining taste and nutrition of the food, and improving a life quality of a user.

In addition, the refrigerator according to the present disclosure may also have the following additional technical features.

According to one embodiment of the present disclosure, the refrigerator may further comprise: at least one refrigerating chamber disposed in the main body; a refrigerating evaporator disposed in the main body and at a back side of the at least one refrigerating chamber, and spaced apart from the at least one refrigerating chamber via a refrigerating air duct cover plate; and a refrigerating fan disposed above the refrigerating evaporator and configured to blow cold air generated by the refrigerating evaporator into the at least one refrigerating chamber for refrigerating the at least one refrigerating chamber, in which the controller is further configured to control the refrigerating fan to refrigerate the refrigerating chamber.

In this embodiment, as the refrigerating chamber is controlled by the refrigerating evaporator independently, it has a high moisturizing function, thus prolonging a fresh period of food rich in water such as vegetables and fruits.

According to one embodiment of the present disclosure, each of the freezing evaporator and the refrigerating evaporator is configured as a finned-tube evaporator.

According to one embodiment of the present disclosure, a plurality of refrigerating air outlets are formed in the refrigerating air duct cover plate, and a plurality of freezing air outlets are formed in the freezing air duct cover plate.

According to one embodiment of the present disclosure, the refrigerator further comprises a quick-freezing control unit configured to start or stop the quick-freezing.

According to one embodiment of the present disclosure, the controller controls the freezing fan to stop working and controls the quick-freezing fan to work at a maximum rotating speed when the quick-freezing control unit starts the quick-freezing.

According to one embodiment of the present disclosure, the controller controls the quick-freezing fan to stop working when the quick-freezing control unit stops the quick-freezing.

According to one embodiment of the present disclosure, the refrigerator further comprises a quick-freezing temperature sensor configured to sense a temperature in the quick-freezing chamber. The controller controls the quick-freezing fan to stop working or controls the quick-freezing fan to work at a low speed when the temperature in the quick-freezing chamber is less than a first predetermined temperature (T1) or a quick-freezing time is larger than a first predetermined time (a).

According to one embodiment of the present disclosure, the refrigerator further comprises a freezing temperature sensor configured to sense a temperature in the freezing chamber.

According to one embodiment of the present disclosure, the controller controls the freezing fan to work when the temperature in the freezing chamber sensed by the freezing temperature sensor is larger than a freezing starting temperature (Tdk); and the controller controls the freezing fan to stop working when the temperature in the freezing chamber sensed by the freezing temperature sensor is less than a freezing stopping temperature (Tdt), in which the freezing stopping temperature is less than the freezing starting temperature.

According to one embodiment of the present disclosure, the freezing fan and the quick-freezing fan are spaced apart from each other via a baffle plate disposed therebetween in a vertical direction.

According to one embodiment of the present disclosure, the refrigerator comprises a plurality of freezing chambers disposed adjacent to each other in the vertical direction, a first freezing drawer and a quick-freezing chamber disposed adjacent to the first freezing drawer in a horizontal direction are detachably disposed in one of the plurality of freezing chambers, and a second freezing drawer is disposed in each of other ones of the plurality of freezing chambers.

According to one embodiment of the present disclosure, the freezing chamber provided with the quick-freezing chamber is divided into a plurality of portions in a vertical direction, a third freezing drawer is disposed in a portion adjacent to the portion provided with the quick-freezing chamber, and a fourth freezing drawer is disposed in each of remaining ones of the plurality of portions.

According to one embodiment of the present disclosure, adjacent ones of the plurality of portions are spaced apart from each other via a freezing beam disposed in a horizontal direction.

According to one embodiment of the present disclosure, each of the freezing evaporator and the refrigerating evaporator is configured as a finned-tube evaporator.

In the present disclosure, when the controller controls the quick-freezing fan to start forcedly, it controls the quick-freezing fan to work at the maximum rotating speed, such that the food to be stored passes the zone of maximum ice crystal formation quickly, thus ensuring the quality of the food to the maximum extent and maintaining the taste and the nutrition of the food.

Additional aspects and advantages of the present disclosure will be given in part in the following descriptions, become apparent in part from the following descriptions, or be learned from the practice of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

It is to be understood that phraseology and terminology used herein with reference to device or element orientation (such as, terms like "up", "down", "front", "rear", "left", "right", "top", "bottom", "inside", "outside") are only used to simplify description of the present invention, and do not indicate or imply that the device or element referred to must have or operated in a particular orientation. They cannot be seen as limits to the present disclosure.

Moreover, terms of "first" and "second" are only used for description and cannot be seen as indicating or implying relative importance.

It is to be explained that terms of "installation", "linkage" and "connection" shall be understood broadly, for example, it could be permanent connection, removable connection or integral connection; it could be direct linkage, indirect linkage or inside linkage within two elements. Those skilled in the art shall understand the concrete notations of the terms mentioned above according to specific circumstances.

Figure 1:
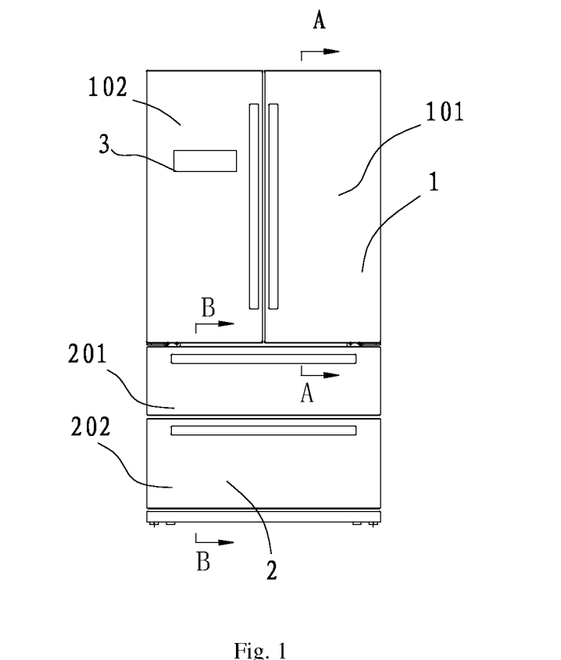
FIG. 1 is a front view of a refrigerator according to an embodiment of the present disclosure.

In the following, a refrigerator 100 according to embodiments of the present disclosure will be described with reference to FIGS. 1-6. The refrigerator 100 has a function of improving taste and nutrition of quick-frozen food. FIG. 1 is a front view of a refrigerator 100 according to an embodiment of the present disclosure.

Figure 9:
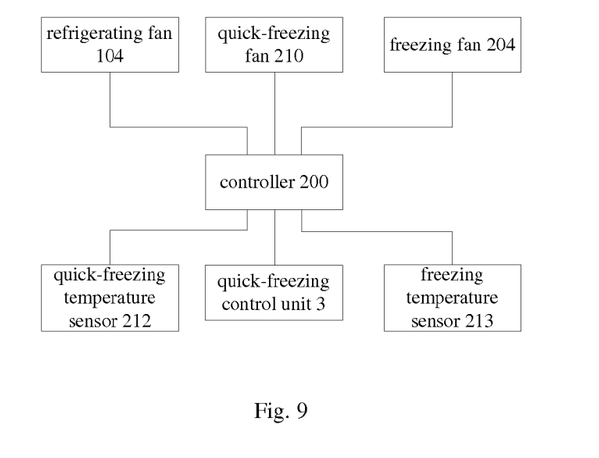
FIG. 9 is a schematic diagram of a control system of a refrigerator according to an embodiment of the present disclosure.

Specifically, the refrigerator 100 comprises: a main body 4; at least one freezing chamber 2 disposed in the main body 4, in which the at least one freezing chamber 2 comprises at least one quick-freezing chamber 209; a freezing evaporator 205 disposed in the main body 4 and at a back side 21 of the at least one freezing chamber 2, and spaced apart from the at least one freezing chamber 2 via a freezing air duct cover plate 206, in which a freezing air outlet 213 is formed in the freezing air duct cover plate 206; a freezing fan 204 corresponding to the at least one freezing chamber 2 and a quick-freezing fan 210 corresponding to the at least one quick-freezing chamber 209, in which the freezing fan 204 and the quick-freezing fan 210 are disposed above the freezing evaporator 205 respectively and configured to blow cold air generated by the freezing evaporator 205 into the at least one freezing chamber 2 and the at least one quick-freezing chamber 209 respectively; and a controller 200 (as shown in FIG. 9) configured to control the freezing fan 204 and the quick-freezing fan 210, in which the controller 200 controls the quick-freezing fan 210 to quick-freeze the at least one quick-freezing chamber 209 when needed.

With the refrigerator 100 according to embodiments of the present disclosure, by disposing the quick-freezing chamber 209 in the freezing chamber 2, a special requirement of quick-freezing can be realized. Moreover, under the quick-freezing mode, food needed to be stored in the refrigerator can pass the zone of maximum ice crystal formation quickly, thus ensuring a quality of the food to a maximum extent, maintaining taste and nutrition of the food, and improving a life quality of a user.

Figure 3:
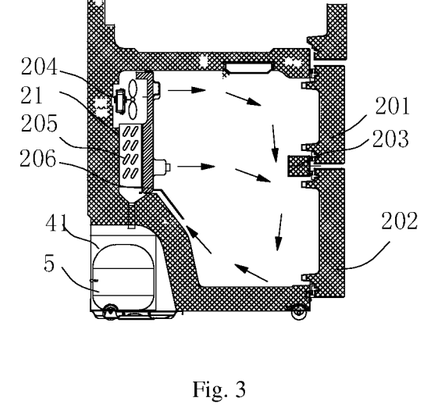
FIG. 3 is a partial sectional view of a refrigerating chamber of the refrigerator taken along line B-B shown in FIG. 1.

According to one embodiment of the present disclosure, as shown in FIG. 3, cold air generated by the freezing evaporator 205 is blown into the freezing chamber 2 via a plurality of the freezing air outlets 213 in the freezing air duct cover plate 206 for freezing the freezing chamber 2. Alternatively, the freezing evaporator 205 may be a finned-tube evaporator. As shown in FIG. 1, the refrigerator 1 may further comprise a quick-freezing control unit 3. The quick-freezing control unit 3 is configured to start or stop the quick-freezing. The quick-freezing control unit 3 may be a quick-freezing key 3 formed on a door of the refrigerator 100 for facilitating the user's operation.

Figure 2:
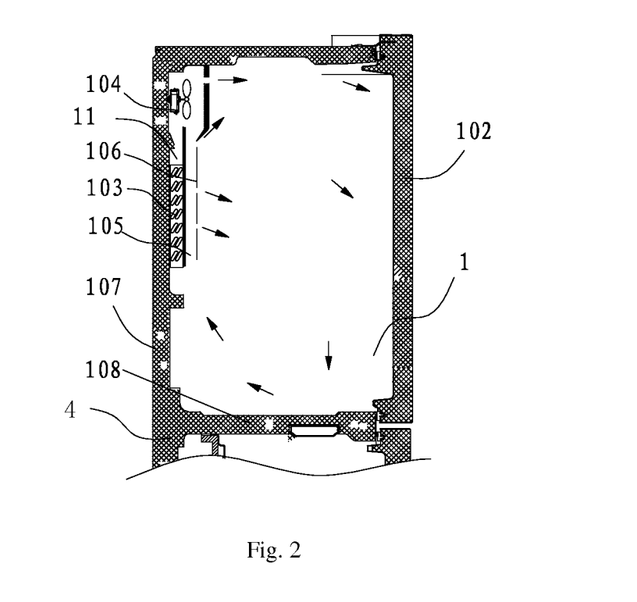
FIG. 2 is a partial sectional view of a refrigerating chamber of the refrigerator taken along line A-A shown in FIG. 1.

According to one embodiment of the present disclosure, as shown in FIG. 2, the refrigerator 100 may further comprise: a refrigerating chamber 1 disposed in the main body 4; a refrigerating evaporator 103 disposed in the main body 4 and at a back side 11 of the refrigerating chamber 1, and spaced apart from the refrigerating chamber 1 via a refrigerating air duct cover plate 106; and a refrigerating fan 104 disposed above the refrigerating evaporator 103 and configured to blow cold air generated by the refrigerating evaporator 103 into the refrigerating chamber 1 for refrigerating the refrigerating chamber 1. The controller 200 is further configured to control the refrigerating fan 104 to refrigerate the refrigerating chamber 1. According to one embodiment of the present disclosure, the refrigerator 1 may comprise a plurality of refrigerating chambers 1. Alternatively, the refrigerating evaporator 103 is a finned-tube evaporator. A plurality of refrigerating air outlets 107 may be formed in the refrigerating air duct cover plate 106 for blowing cold air in a refrigerating air duct 105 into the refrigerating chamber 1 via the plurality of refrigerating air outlets 107. Thus, the refrigerating chamber 1 has a high moisturizing function, thus prolonging a fresh period of food rich in water such as vegetables and fruits.

In this embodiment, as the refrigerating chamber 1 is controlled by the refrigerating evaporator 103 independently, the refrigerating chamber 1 has the high moisturizing function, thus prolonging the fresh period of food rich in water such as vegetables and fruits.

Figure 5:
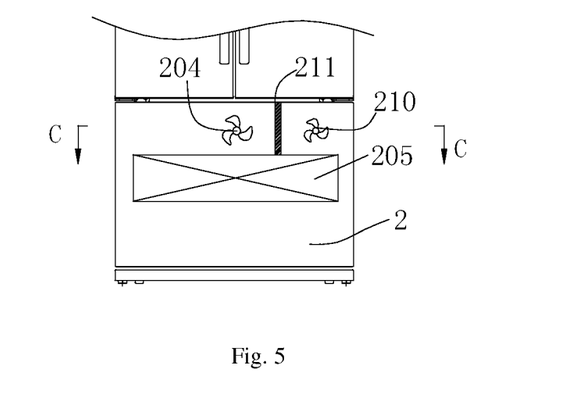
FIG. 5 is a sectional view of the freezing chamber of the refrigerator shown in FIG. 1, in which a freezing fan and a quick-freezing fan are shown.

As shown in FIGS. 3 and 5, the freezing fan 204 and the quick-freezing fan 210 are disposed above the freezing evaporator 205 and configured to blow cold air generated by the freezing evaporator 205 into the freezing chamber 2 and the quick-freezing chamber 209 via the plurality of freezing air outlets 213 in the freezing air duct cover plate 206 for refrigerating the freezing chamber 2 and the quick-freezing chamber 209 respectively. It should be noted that, the number of the freezing fans 204 and the number of the quick-freezing fans 210 can be set according to actual requirements, and are not limited to one. For example, when a plurality of quick-freezing chambers are disposed in the freezing chamber, a plurality of quick-freezing fans can be disposed according to the number of the plurality of quick-freezing chambers. The freezing fans can be disposed in a manner similar to that of the quick-freezing fans.

At this time, as shown by arrows in FIG. 3, cold air flows through the freezing evaporator 205 under an action of the freezing fan 204 and the quick-freezing fan 210, and flows into the freezing chamber 2 and the quick-freezing chamber 209 via the plurality of freezing air outlets 213 in the freezing air duct cover plate 206 for directing air, and then flows back to a bottom of the freezing evaporator 205, thus forming a cycle to refrigerate the freezing chamber 2 and the quick-freezing chamber 209. As shown in FIG. 5, the freezing fan 204 and the quick-freezing fan 210 are separated from each other via a baffle plate 211 disposed therebetween in a vertical direction.

Again with reference to FIG. 2, the refrigerating fan 104 is disposed above the refrigerating evaporator 103. The refrigerating fan 104 blows cold air generated by the refrigerating evaporator 103 into the refrigerating air duct 105, and then blows the cold air into the refrigerating chamber 1 via the plurality of refrigerating air outlets 107 in the refrigerating air duct cover plate 106 for refrigerating the refrigerating chamber 1. At this time, as shown by arrows in FIG. 2, under an action of the refrigerating fan 104, the cold air flows through the refrigerating evaporator 103 into the refrigerating air duct 105, and flows into the refrigerating chamber 1 via the plurality of refrigerating air outlets 107 in the refrigerating air duct cover plate 106, and then flows back to the bottom of the refrigerating evaporator 103, thus forming a cycle to refrigerate the refrigerating chamber 1.

It can be seen from embodiments described above that, the refrigerating evaporator 103 and the freezing evaporator 205 works independently from each other, and collectively forms the double-system refrigerator according to embodiments of the present disclosure.

As shown in FIG. 9, the controller 200 is connected with the freezing fan 204, the quick-freezing fan 210 and the quick-freezing control unit 3 respectively. When the quick-freezing control unit 3 starts the quick-freezing function, the controller 20 controls the freezing fan 204 to stop working and controls the quick-freezing fan 210 to work at a maximum rotating speed, so as to make the quick-freezing chamber strong cold, such that the food needed to be stored in the refrigerator passes the zone of maximum ice crystal formation quickly, thus ensuring the quality of the food to the maximum extent. When the quick-freezing control unit 3 stops the quick-freezing function, the controller 200 controls the quick-freezing fan 210 to stop working.

With the refrigerator 100 according to embodiments of the present disclosure, by dividing the freezing chamber 2 into a plurality of portions and providing the quick-freezing chamber 209, the special requirement of quick-freezing can be realized. Moreover, under the quick-freezing mode, the food needed to be stored in the refrigerator can pass the zone of maximum ice crystal formation quickly, thus ensuring the quality of the food to the maximum extent, maintaining the taste and nutrition of the food, and improving the life quality of the user. Furthermore, as the refrigerating chamber 2 is controlled by the refrigerating evaporator 103 independently, the fresh period of the food rich in water such as vegetables and fruits can be prolonged.

According to one embodiment of the present disclosure, the freezing chamber 2 provided with the quick-freezing chamber 209 is divided into a plurality of portions in the vertical direction, a third freezing drawer is disposed in a portion adjacent to the portion provided with the quick-freezing chamber 209, and a fourth freezing drawer is disposed in each of remaining ones of the plurality of portions. In the following, this design concept will be explained with reference to drawings.

Figure 4:
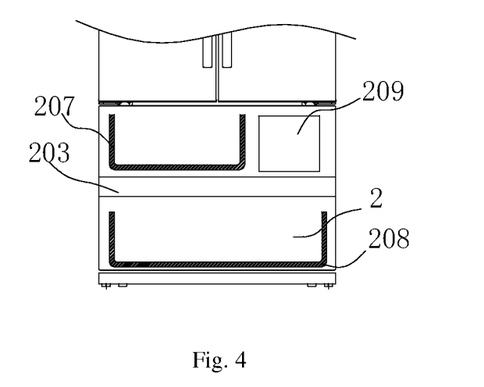
FIG. 4 is a sectional view of the freezing chamber of the refrigerator shown in FIG. 1.
Figure 6:
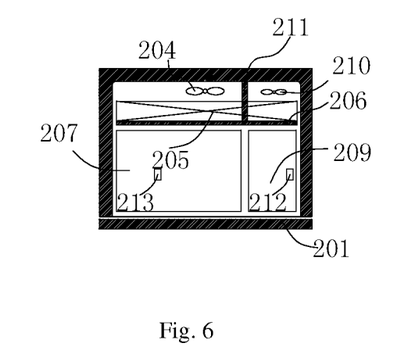
FIG. 6 is a sectional view of the freezing chamber taken along line C-C shown in FIG. 5.

As shown in FIGS. 1, 3 and 4, the freezing chamber 2 is divided into an upper freezing portion 201 and a lower freezing portion 202. The quick-freezing chamber 209 and a freezing drawer 207 are disposed in the upper freezing portion 201, and a third freezing drawer 208 is disposed in the lower freezing portion 202. The quick-freezing chamber 209 is separated from the freezing drawer 207 via the baffle plate 211. In one example of the present disclosure, as shown in FIG. 4, the quick-freezing chamber 209 is disposed at the right of the freezing drawer 207. Certainly, the present disclosure is not limited to this, and the quick-freezing chamber 209 may alternatively be disposed at the left of the freezing drawer 207. As shown in FIG. 3, a condenser 41 and a compressor 5 may be disposed in a mechanical room area at a bottom of the back side of the freezing chamber 2. The upper freezing portion 201 and the lower freezing portion 202 are separated from each other via a freezing beam 203. As shown in FIGS. 5 and 6, an upper space of the freezing evaporator 205 is formed by the freezing air duct cover plate 206 and side walls and a rear wall of the main body 4 of the refrigerator, and is divided into two portions by the baffle plate 211. The freezing fan 204 and the quick-freezing fan 210 are respectively disposed in the two portions separated by the baffle plate 211. A front side of the freezing fan 204 directly faces the freezing drawer 207 in the upper freezing portion 201, and a front side of the quick-freezing fan 210 directly faces the quick-freezing chamber 209. At this time, the quick-freezing fan 210, the freezing air duct cover plate 206, the baffle plate 211, and the side walls and the rear wall of the main body 4 form an air circulation system for the quick-freezing chamber 209 to quick-freeze the food.

According to a further embodiment of the present disclosure, as shown in FIG. 6, the refrigerator 100 further comprises a quick-freezing temperature sensor 212 disposed in the quick-freezing chamber 209 and configured to detect a temperature in the quick-freezing chamber 209. As shown in FIG. 9, the quick-freezing temperature sensor 212 is connected with the controller 200. The controller 200 controls the quick-freezing fan 210 to stop working or work at a low speed and controls the freezing fan 204 to work normally when the temperature in the quick-freezing chamber 209 is less than a predetermined temperature or a quick-freezing time is larger than a predetermined time (such as 2.5 hours or 3 hours).

Further, after controlling the quick-freezing fan 210 to start forcedly, the controller 200 controls the quick-freezing fan 210 to work at the maximum rotating speed, such that the food needed to be stored in the refrigerator pass the zone of maximum ice crystal formation quickly, thus ensuring the quality of the food to the maximum extent, and maintaining the taste and nutrition of the food.

Figure 7:
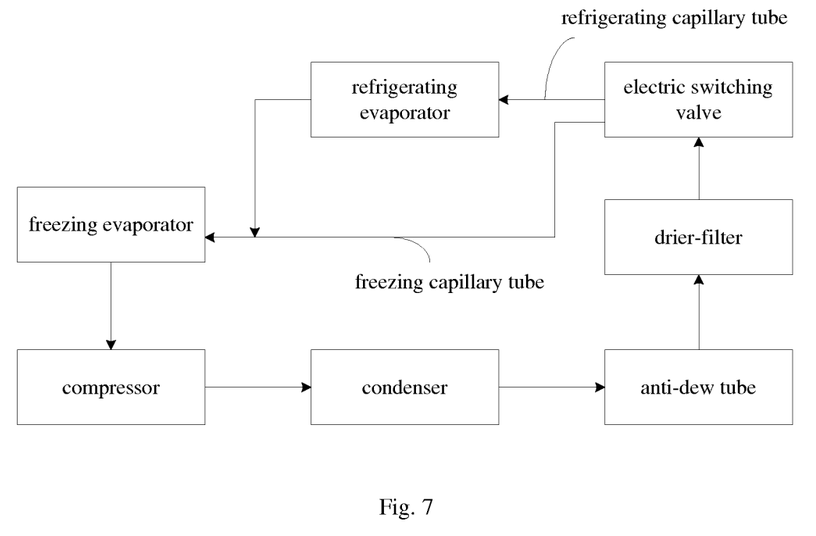
FIG. 7 is a schematic diagram of a refrigerating system of the refrigerator shown in FIG. 1.

FIG. 7 schematically shows a refrigerating system of the refrigerator 100 shown in FIG. 1. As shown in FIG. 7, the refrigerating system of the refrigerator is formed by the compressor, the condenser, an anti-dew tube, a drier-filter, a capillary tube and evaporators (the refrigerating evaporator and the freezing evaporator). The refrigerating system of the refrigerator performs a heat exchange by a circulation of a refrigerant to transfer heat in the refrigerator to air outside the refrigerator, thus decreasing the temperature in the refrigerator 100. The compressor is used to transport and compress refrigerant vapor under a driving of a motor, so as to make the refrigerant circulate in the system. The condenser is a primary heat exchange equipment in the refrigerating system and is mainly used to dissipate heat of the high-temperature and high-pressure refrigerant vapor exhausted from the compressor to ambient air, so as to cool the refrigerant vapor and liquefy it to a liquid. The anti-due tube is both used as a condenser and used to increase a temperature around a door of the freezing chamber, thus preventing condensation around the door of the freezing chamber. The capillary tube is generally used to keep a certain pressure difference between the condenser refrigerant and the evaporator refrigerant, so as to ensure that the refrigerant vapor in the condenser has a relatively high pressure so as to condense the refrigerant vapor into the liquid in the condenser and ensure that the refrigerant liquid in the evaporator has a relatively low pressure so as to evaporate the refrigerant liquid into a gas in the evaporator. Furthermore, the capillary tube is also used to control a flow rate of the refrigerant. If a resistance of the capillary tube is large, the flow rate of the refrigerant is small, a refrigerating capacity is small, and an evaporating temperature is low. If the resistance of the capillary tube is small, the flow rate of the refrigerant is large, the refrigerating capacity is large, and the evaporating temperature is high. As shown in FIG. 7, the drier-filter is generally disposed between the condenser and the capillary tube, and used to adsorb water in the refrigerating system so as to prevent ice block. Moreover, the drier-filter also plays a filtering function. The evaporators are used to evaporate liquid in the refrigerant gas-liquid mixture into a gas under a low pressure, so as to absorb heat in the refrigerator, thus realizing the refrigerating. FIG. 7 shows the refrigerating system having a double-circulation system. It should be noted that, the refrigerating circulation of the refrigerator is well known to those skilled in the art, and will not be described in detail herein for the sake of brevity.

It should be noted that, according to an alternative embodiment of the present disclosure, the refrigerator may also comprise a plurality of freezing chambers 2 disposed adjacent to each other in the vertical direction, a freezing drawer and a quick-freezing chamber disposed adjacent to the freezing drawer in a horizontal direction are detachably disposed in one of the plurality of freezing chambers 2, and a freezing drawer is also disposed in each of other ones of the plurality of freezing chambers 2, such that it is convenient for the user to store and take food.

In the following, a working process of the refrigerating system of the refrigerator 100 according to embodiments of the present disclosure will be described with reference to FIGS. 1-7, in which a side by side refrigerator will be taken as an example for explanation.

As shown in FIG. 7, the refrigerator 100 according to embodiments of the present disclosure has a double-circulation system of the finned-out evaporator, i.e., as shown in FIGS. 2 and 3, the freezing evaporator 205 is disposed above the freezing chamber 2 and only provides cooling energy for the freezing chamber 2, while the refrigerating evaporator 103 is disposed above the refrigerating chamber 1 and only provides cooling energy for the refrigerating chamber 1. At this time, as the refrigerating chamber 1 is controlled by the refrigerating evaporator 103 independently, the fresh period of the food rich in water such as vegetables and fruits are prolonged.

When the refrigerator works, as shown in FIG. 2, the refrigerating evaporator 103 provides cooling energy for the refrigerating chamber 1. At this time, under an action of the refrigerating fan 104, the cold air flows through the refrigerating evaporator 103 into the refrigerating air duct 105, and flows into the refrigerating chamber 1 via the plurality of refrigerating air outlets 107 in the refrigerating air duct cover plate 106, and then flows back to the bottom of the refrigerating evaporator 103, thus forming a cycle to refrigerate the refrigerating chamber 1.

As shown in FIG. 3, the freezing evaporator 205 provides cooling energy for the freezing chamber 2. When the food is not needed to be quick frozen, under an action of the freezing fan 204, the cold air flows through the freezing evaporator 205, and flows into the freezing drawer 207 and the lower freezing portion 202 of the freezing chamber 2 via the plurality of freezing air outlets 213 in the freezing air duct cover plate 206, and then flows back to the bottom of the freezing evaporator 205, thus forming a cycle to refrigerate the freezing chamber 2.

As shown in FIGS. 4 and 6, the upper space of the freezing evaporator 205 is formed by the freezing air duct cover plate 206 and the side walls and the rear wall of the main body 4 of the refrigerator, and is divided into two portions by the baffle plate 211. The freezing fan 204 and the quick-freezing fan 210 are respectively disposed in the two portions separated by the baffle plate 211. The front side of the freezing fan 204 directly faces the freezing drawer 207 in the upper freezing portion 201, and the front side of the quick-freezing fan 210 directly faces the quick-freezing chamber 209. At this time, the quick-freezing fan 210, the freezing air duct cover plate 206, the baffle plate 211, and the side walls and the rear wall of the main body 4 form the air circulation system of the quick-freezing chamber 209.

Figure 8:
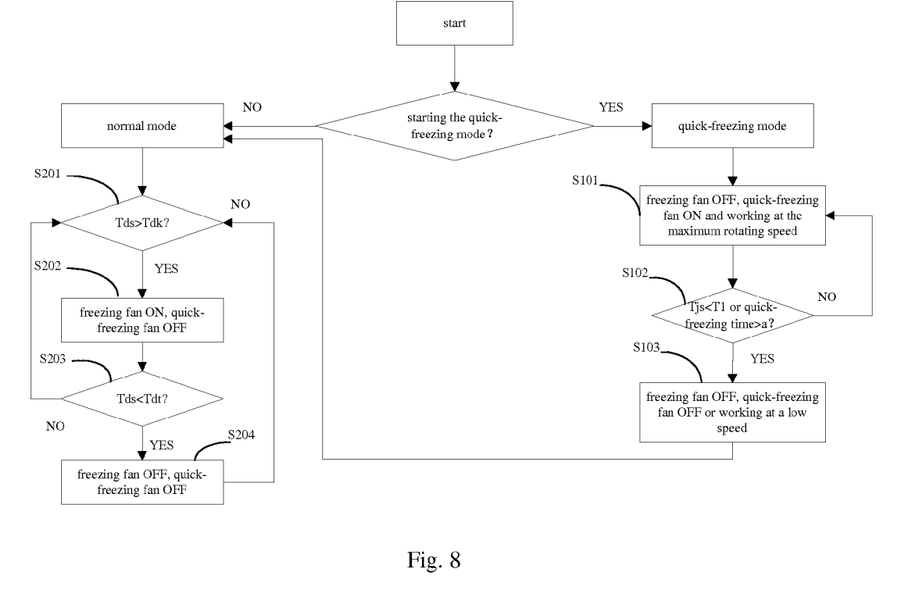
FIG. 8 is a flow chart of controlling the refrigerator shown in FIG. 1.

FIG. 8 is a flow chart of controlling the refrigerator 100 shown in FIG. 1. As shown in FIG. 8, when the user does not start the quick-freezing mode via the quick-freezing control unit 3 disposed on the double door of the refrigerator 100, the refrigerator works in a normal mode. At this time, whether the temperature (Tds) sensed by the freezing temperature sensor 213 is larger than a freezing starting temperature (Tdk) is determined (step S201). When the temperature (Tds) sensed by the freezing temperature sensor 213 is larger than the freezing starting temperature (Tdk), the controller 200 controls the freezing fan 204 to work (ON) and controls the quick-freezing fan 210 to stop working (OFF) (step S202). Otherwise, step S203 is executed. Subsequently, when the temperature (Tds) sensed by the freezing temperature sensor 213 is less than a freezing stopping temperature (Tdt), the controller 200 controls the freezing fan 204 to stop working (step S204). Otherwise, step S201 is executed. The freezing stopping temperature (Tdt) is less than the freezing starting temperature (Tdk).

When the user starts the quick-freezing mode via the quick-freezing control unit 3 disposed on the double door of the refrigerator 100, the refrigerator works in the quick-freezing mode. At this time, the quick-freezing fan 210 starts to work (ON) and works at the maximum rotating speed, and the freezing fan 204 is forced to stop working (OFF) (step S101). Specifically, as shown in FIG. 1, the controller 200 controls the freezing fan 204 to stop forcedly, and controls the quick-freezing fan 210 to start forcedly. At this time, under the action of the quick-freezing fan 210, the cold air flows through the freezing evaporator 205, and flows into the quick-freezing chamber 209 via the plurality of freezing air outlets 213 in the freezing air duct cover plate 206 for directing air, and then flows back to the bottom of the freezing evaporator 205, thus forming a cycle to quick-freeze the food in the quick-freezing chamber 209. Thus, the food quickly pass the zone of maximum ice crystal formation, crystal is prevented from being formed during the quick-freezing procedure, and the original tissue of the food is prevented from being broken, thus maintaining the original taste and nutrition of the food. Then, whether the temperature (Tjs) sensed by the quick-freezing temperature sensor 212 is less than the predetermined quick-freezing temperature (T1) or whether the quick-freezing time is larger than the predetermined time (a) is determined (step S102). When the temperature (Tjs) sensed by the quick-freezing temperature sensor 212 is less than the predetermined quick-freezing temperature (T1) or the quick-freezing time is larger than the predetermined time (a), the controller 200 controls the quick-freezing fan 210 to stop working or controls the quick-freezing fan 210 to work at the low speed (step S103), and then the system enters the normal mode until next cycle. Otherwise, step S101 is executed.

With the refrigerator according to embodiments of the present disclosure, by dividing the freezing chamber into a plurality of portions and providing the quick-freezing chamber therein, the special requirement of quick-freezing can be realized. Moreover, under the quick-freezing mode, the food needed to be stored in the refrigerator can pass the zone of maximum ice crystal formation quickly, thus ensuring the quality of the food to the maximum extent, maintaining the taste and nutrition of the food, and improving the life quality of the user. Furthermore, as the refrigerating chamber is controlled by the refrigerating evaporator independently, the refrigerating chamber has a high moisturizing function, and the fresh period of the food rich in water such as vegetables and fruits can be prolonged.

It can be noted that, although the present disclosure is described in detail with reference to the refrigerator having the double-circulation system of the refrigerating chamber and the freezing chamber, it is apparent for those skilled in the art to apply the above technical concept to the refrigerator having only the freezing chamber, which falls into the scope of the present disclosure.

Reference throughout this specification to "an embodiment", "some embodiments", "one schematic embodiment", "an example", "a specific examples", or "some examples" means that a particular feature, structure, material, or characteristic described in connection with the embodiment or example is included in at least one embodiment or example of the disclosure. Thus, the appearances of the phrases such as "in some embodiments", "in one embodiment", "in an embodiment", "an example", "a specific examples", or "some examples" in various places throughout this specification are not necessarily referring to the same embodiment or example of the disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A refrigerator having a quick-freezing function, comprising:
    a main body including at least one door;
    at least one refrigerating chamber disposed in the main body, the at least one refrigerating chamber having an air circulation system;
    at least one freezing chamber disposed in the main body, wherein the at least one freezing chamber comprises at least one quick-freezing chamber;
    a freezing evaporator disposed in the main body and behind the at least one freezing chamber, and spaced apart from the at least one freezing chamber via a freezing air duct cover plate, wherein a plurality of freezing air outlets are formed in the freezing air duct cover plate;
    a freezing fan corresponding to the at least one freezing chamber and a quick-freezing fan corresponding to the at least one quick-freezing chamber, wherein the freezing fan and the quick-freezing fan are disposed above the freezing evaporator respectively and configured to blow cold air from the freezing evaporator into the at least one freezing chamber and the at least one quick-freezing chamber respectively;
    a controller configured to control the freezing fan and the quick-freezing fan, wherein the controller is further configured to controls the quick-freezing fan to carry out quick freezing on the at least one quick-freezing chamber when needed; and
    a quick-freezing control unit configured to switch the refrigerator between a normal mode where there is no quick-freezing and a quick-freezing mode where the quick-freezing is carried out based on activation of a key disposed on the at least one door of the refrigerator;
    a quick-freezing temperature sensor configured to sense a temperature in the quick-freezing chamber, wherein the controller is further configured to controls the quick-freezing fan to transition from the maximum rotating speed to a low speed when the temperature in the quick-freezing chamber is less than a first predetermined temperature (T1) or a quick-freezing time is larger than a first predetermined time (a);
    wherein the controller is further configured to controls the freezing fan to stop working and controls the quick-freezing fan to work at a maximum rotating speed when the quick-freezing control unit starts the quick-freezing;
    wherein the freezing evaporator provides cooling energy for the at least one freezing chamber, when the food is not needed to be quick frozen, under an action of the freezing fan, the cold air flows through the freezing evaporator, and flows into the at least one freezing chamber and a lower freezing portion of the at least one freezing chamber via the plurality of freezing air outlets, and then flows back to a bottom of the freezing evaporator, thus forming a cycle to refrigerate the at least one freezing chamber; and
    wherein an upper space of the freezing evaporator is formed by the freezing air duct cover plate and side walls and a rear wall of the main body, and is divided into two portions by a baffle plate, the freezing fan and the quick-freezing fan are respectively disposed in the two portions, a front side of the freezing fan directly faces the at least one freezing chamber, a front side of the quick-freezing fan directly faces the at least one quick-freezing chamber, and the quick-freezing fan, the freezing air duct cover plate, the baffle plate, and the side walls and the rear wall of the main body form an air circulation system of the at least one quick-freezing chamber separate from the air circulation system of the at least one refrigerating chamber.

2. The refrigerator according to claim 1, further comprising:
    a refrigerating evaporator disposed in the main body and behind the at least one refrigerating chamber, and spaced apart from the at least one refrigerating chamber via a refrigerating air duct cover plate; and
    a refrigerating fan disposed above the refrigerating evaporator and configured to blow cold air from the refrigerating evaporator into the at least one refrigerating chamber for refrigerating the at least one refrigerating chamber,
    wherein the controller is further configured to control the refrigerating fan to refrigerate the refrigerating chamber.

3. The refrigerator according to claim 2, wherein a plurality of refrigerating air outlets are formed in the refrigerating air duct cover plate.

4. The refrigerator according to claim 3, wherein the controller is further configured to controls the quick-freezing fan to stop working when the quick-freezing control unit stops the quick-freezing.

5. The refrigerator according to claim 4, further comprising:
    a freezing temperature sensor configured to sense a temperature in the freezing chamber.

6. The refrigerator according to claim 5, wherein the controller is further configured to control the freezing fan to work when the temperature in the freezing chamber sensed by the freezing temperature sensor is larger than a freezing starting temperature (Tdk); and
    wherein the controller is further configured to controls the freezing fan to stop working when the temperature in the freezing chamber sensed by the freezing temperature sensor is less than a freezing stopping temperature (Tdt), in which the freezing stopping temperature is less than the freezing starting temperature.

7. The refrigerator according to claim 1, wherein the refrigerator comprises a plurality of freezing chambers disposed adjacent to each other in the vertical direction, a first freezing drawer and the quick-freezing chamber disposed adjacent to the first freezing drawer in a horizontal direction are detachably disposed in one of the plurality of freezing chambers, and a second freezing drawer is disposed in one of the plurality of freezing chambers.

8. The refrigerator according to claim 1, wherein the freezing chamber provided with the quick-freezing chamber is divided into a plurality of portions in a vertical direction, a third freezing drawer is disposed in a portion adjacent to the portion provided with the quick-freezing chamber, and a fourth freezing drawer is disposed in one of the plurality of portions.

9. The refrigerator according to claim 8, wherein adjacent ones of the plurality of portions are spaced apart from each other via a freezing beam disposed in a horizontal direction.

10. The refrigerator according to claim 1, wherein each of the freezing evaporator and the refrigerating evaporator is configured as a finned-tube evaporator.

11. The refrigerator according to claim 2, wherein during the quick-freezing fan operating at a low speed, the controller is configured to control the refrigerating fan to switch from an off state to an on state to refrigerate the refrigerating chamber.

* * * * *